United States Patent
Zolfaghari

(10) Patent No.: US 7,587,224 B2
(45) Date of Patent: Sep. 8, 2009

(54) RECONFIGURABLE TOPOLOGY FOR RECEIVER FRONT ENDS

(75) Inventor: Alireza Zolfaghari, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 572 days.

(21) Appl. No.: 11/313,493

(22) Filed: Dec. 21, 2005

(65) Prior Publication Data
US 2007/0141998 A1 Jun. 21, 2007

(51) Int. Cl.
*H04M 1/00* (2006.01)

(52) U.S. Cl. .............. 455/556.1; 455/189.1; 455/190.1; 455/311; 455/315; 455/323; 455/326; 455/331; 375/147

(58) Field of Classification Search ............... 455/189.1, 455/190.1, 311, 315, 323, 326, 331, 556.1; 375/147
See application file for complete search history.

(56) References Cited

U.S. PATENT DOCUMENTS

| | | | | |
|---|---|---|---|---|
| 4,152,653 A | * | 5/1979 | Dobrovolny | ................. 455/331 |
| 4,776,040 A | * | 10/1988 | Ichikawa et al. | ............. 455/315 |
| 5,678,226 A | * | 10/1997 | Li et al. | ........................ 455/333 |
| 6,188,716 B1 | * | 2/2001 | Emery et al. | ................. 375/147 |
| 6,427,069 B1 | * | 7/2002 | Galin | .......................... 455/326 |
| 6,611,680 B2 | * | 8/2003 | Litwin et al. | .................. 455/311 |
| 7,088,980 B2 | * | 8/2006 | Otaka | ........................... 455/323 |
| 7,107,035 B2 | * | 9/2006 | Otaka | ........................... 455/323 |
| 2004/0176064 A1 | * | 9/2004 | Mattisson | .................... 455/313 |
| 2005/0282510 A1 | * | 12/2005 | Bang et al. | ................ 455/190.1 |
| 2006/0057988 A1 | * | 3/2006 | Kirdhart | ................... 455/189.1 |
| 2007/0111695 A1 | * | 5/2007 | Hijikata et al. | ............... 455/323 |

* cited by examiner

*Primary Examiner*—Stephen M D'Agosta
(74) *Attorney, Agent, or Firm*—Garlick Harrison & Markison; James A. Harrison

(57) ABSTRACT

The method and apparatus of the present invention provide for a configurable radio front end topology that allows selectable operation in a single balanced mode and in a double balanced mode of operation. Logic associated with a baseband processor determines whether to operate in a single or double balanced mode of operation and produces the mode control signal to control selective coupling of circuit components according to the specified mode. Switching circuitry is used to switch a Balun in and out of connectivity. Further, a pair of LO polarity blocks are operable to determine the polarity of a differential LO received by associated mixers according to whether a single balanced or double balanced mode is in use.

34 Claims, 9 Drawing Sheets

RECONFIGURABLE TOPOLOGY FOR RECEIVER FRONT ENDS

BACKGROUND

1. Technical Field

The present invention relates to wireless communications and, more particularly, to circuitry for switching logic.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bipolar circuitry, allowing for large signal swings and linear transmitter component behavior. Therefore, many legacy baseband processors employ analog interfaces that communicate analog signals to and from the radio processor.

Radio receiver front ends are often implemented in one of a single balanced or a double balanced topology. Generally a double balanced configuration provides better performance at the cost of increased power consumption. Thus, designers face the difficult design determination as to whether potential customers prefer the single balanced or double balanced radio front ends as they implement design. In some cases, a designer may consider producing two chips, one that employs a single balanced topology and one that employs a double balanced topology.

What is needed, therefore, is a circuit that is operable to allow the user to select between single and double balanced modes of operation and, responsive to such determination, automatically configure the topology responsive to user selection.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
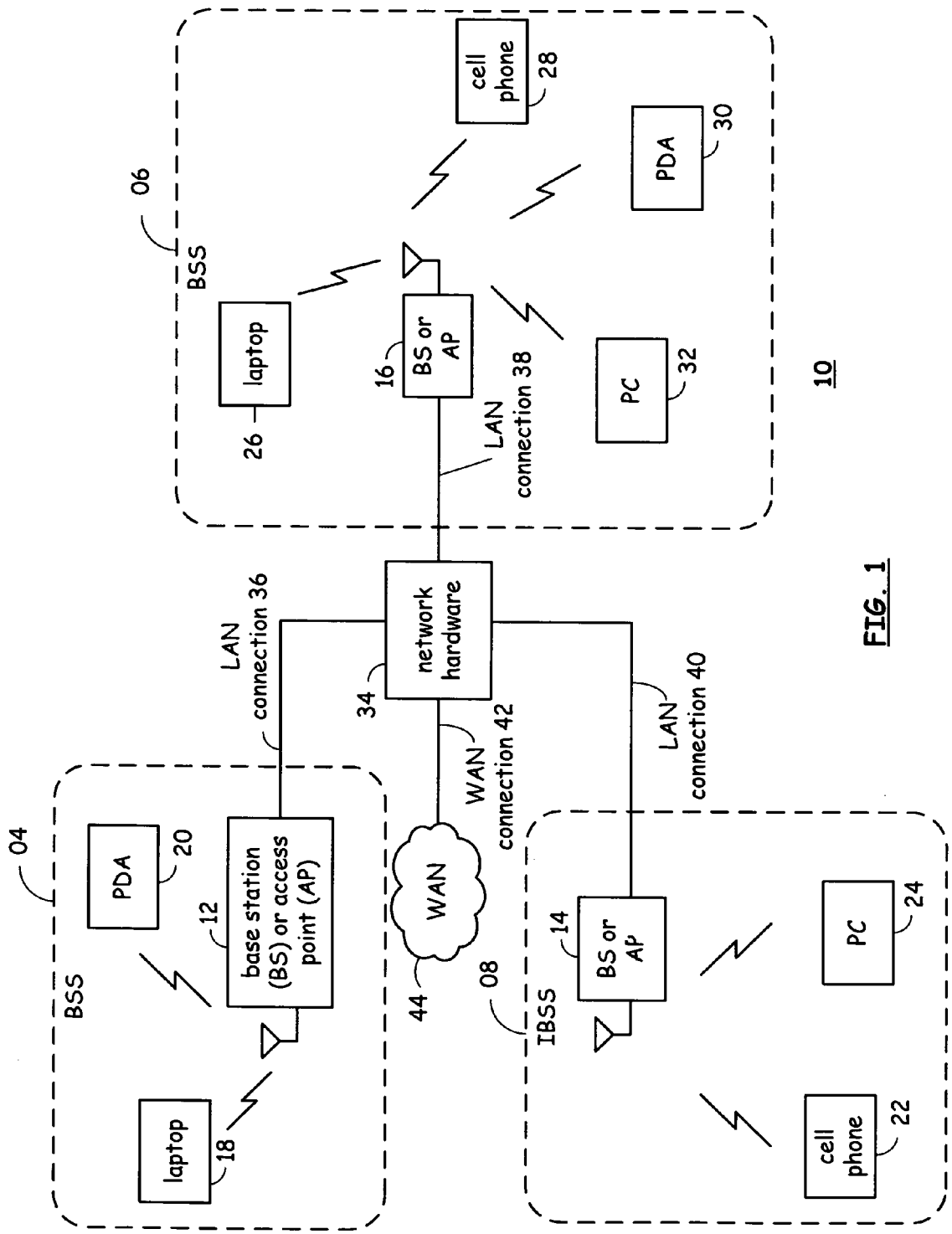
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 4-8.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
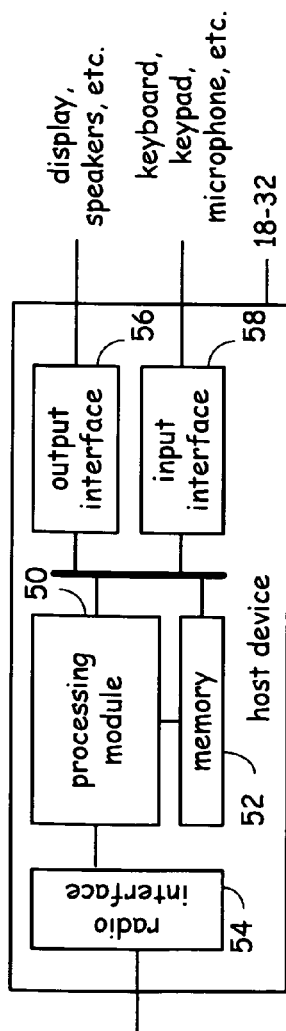
FIG. 2 is a schematic block diagram illustrating a wireless communication host device and an associated radio.
Figure 2:
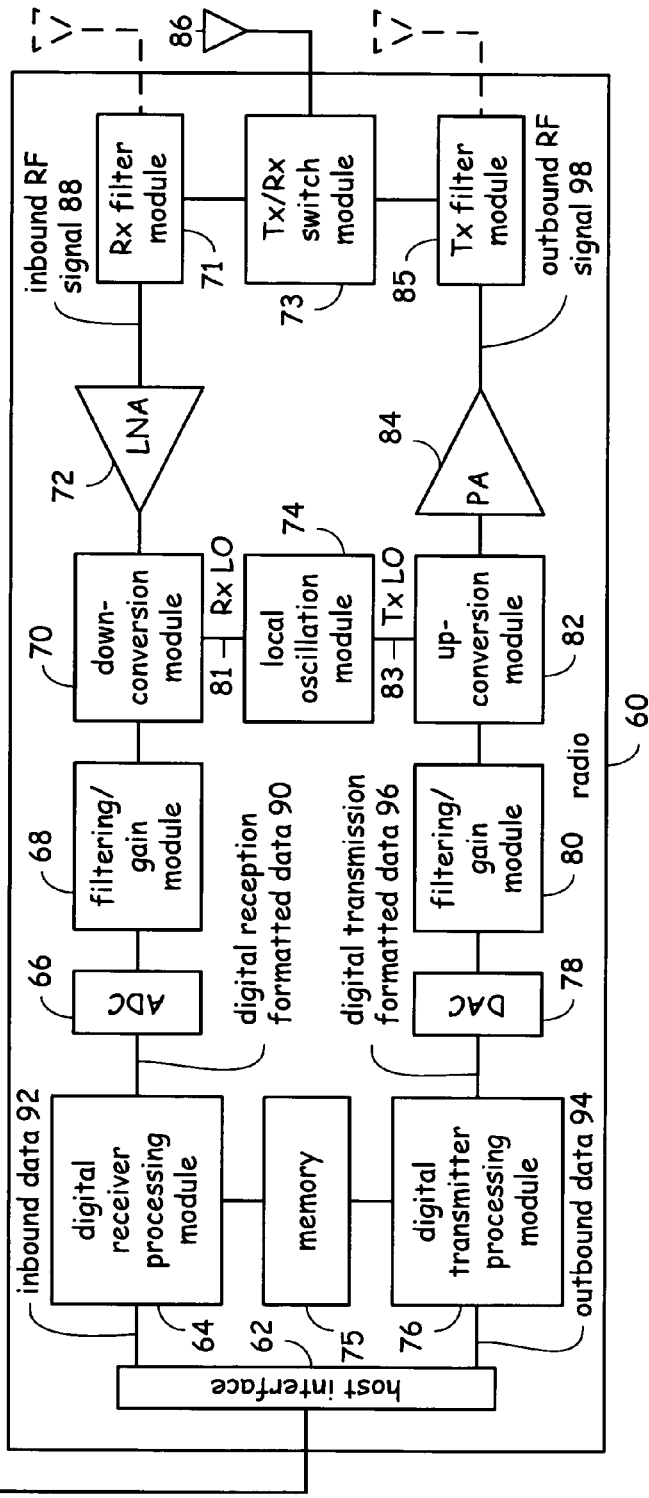

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
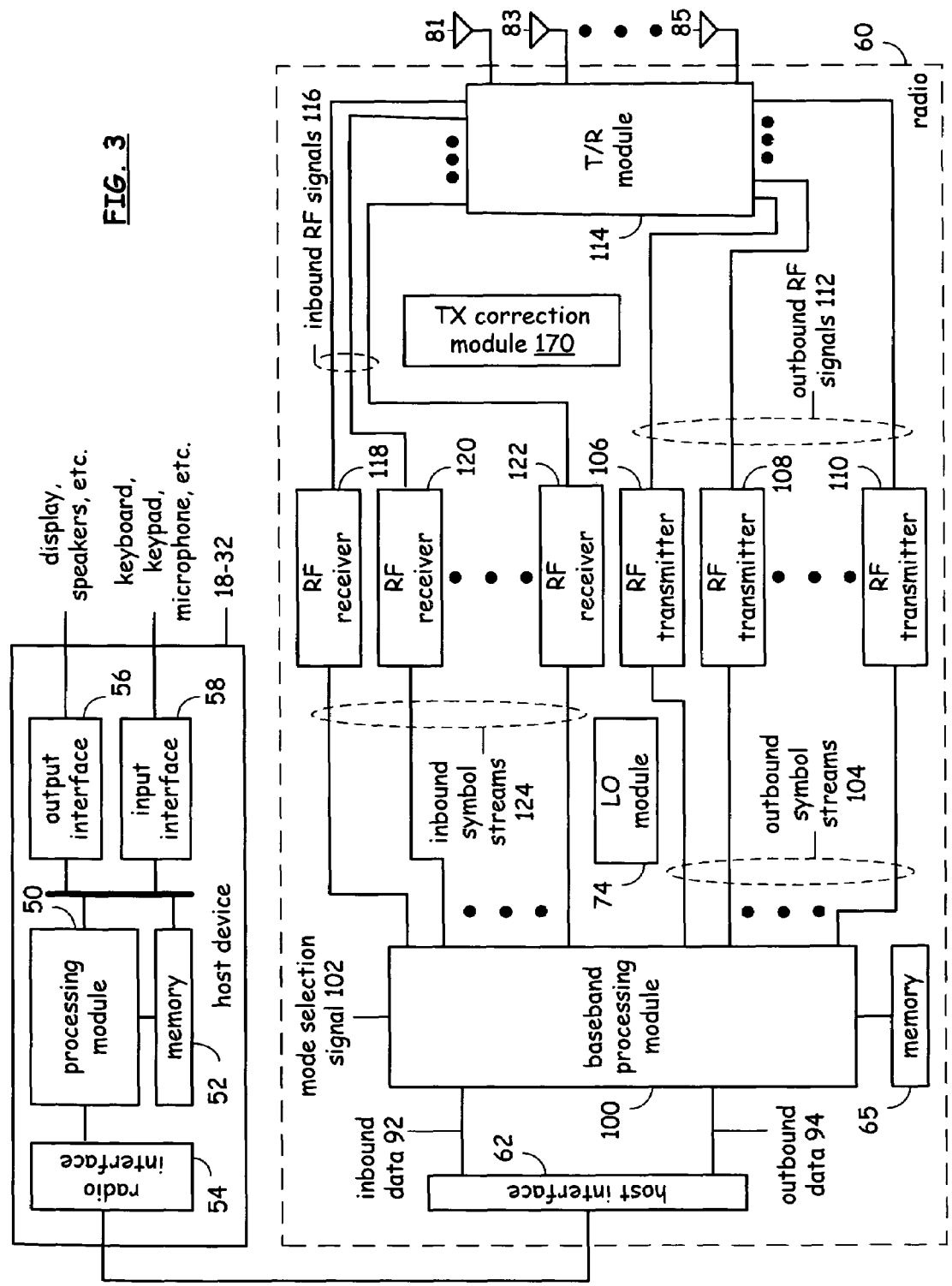
FIG. 3 is a schematic block diagram illustrating a wireless communication device that includes the host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
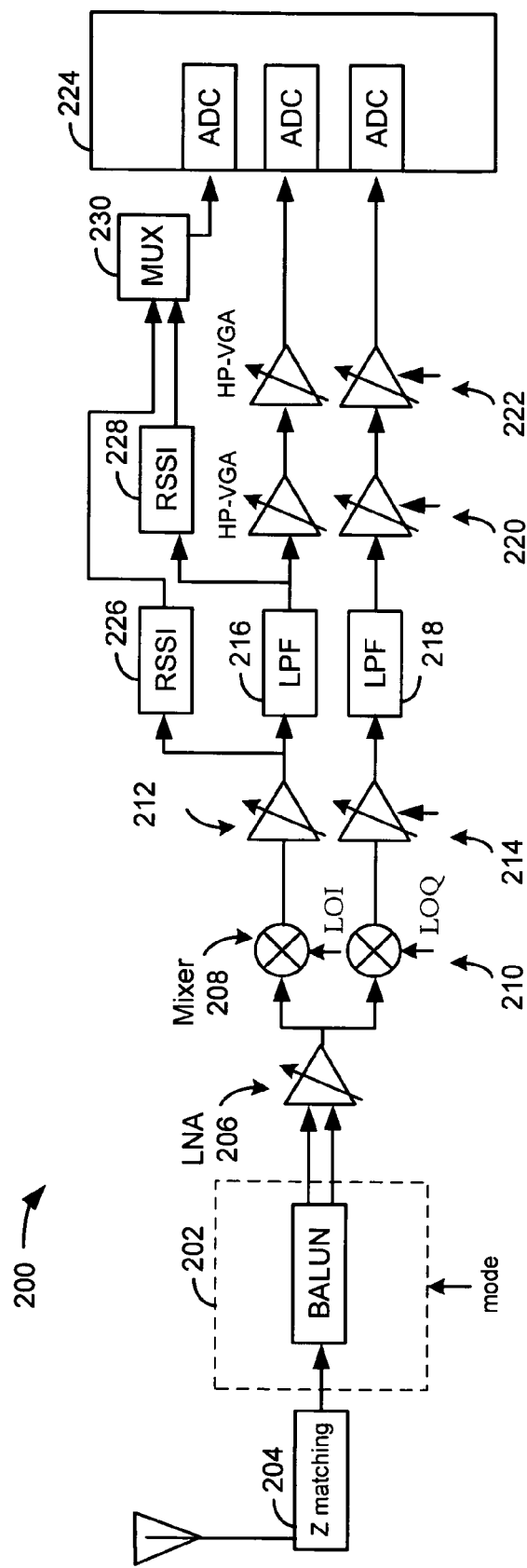
FIG. 4 is a functional block diagram of a front end of a radio receiver according to one embodiment of the invention.

FIG. 4 is a functional block diagram of a front end of a radio receiver according to one embodiment of the invention. An ingoing RF signal is received at an antenna of a radio front end shown generally at 200 and is conducted to a Balun 202. Balun 202 is operably disposed into connectivity between an impedance matching block 204 coupled to the antenna and a low noise amplifier (LNA) 206 based upon a logical state of a received mode signal. In a single balanced mode, the Balun 202 is not operably disposed between the antenna and the LNA 206. In a double balanced mode of operation, Balun 202 is operably disposed into connectivity between the antenna (or impedance matching block 204 if one is included) and LNA 206. In the single balanced mode, the LNA 206 merely receives a single ended signal from the antenna. In a double balanced mode, LNA 206 receives a differential signal from the Balun 202.

Generally, a trade off exists between the two modes of operation. A double balanced mode of operation is beneficial in that LO feedthrough (a known problem with single ended front ends of radio receivers) is less prevalent. Further, a double balanced front end is less sensitive to unwanted signals coupled to an input or to a supply (VDD). Disadvantages to differential double balanced mixer and front ends is that a Balun is required (which consume power). Further, the LNA 206 is required to consume twice the power of single balanced operation to maintain specified noise ratios. As such, designers often struggle with the trade offs between the single ended and differential mixer and front end stages. As such, the embodiment of the present invention provides for one circuit and associated logic that is operable in either the single or double balanced modes of operation according to user specified logic or selection.

Referring again to FIG. 4, LNA 206 produces an amplified ingoing radio frequency signal to mixers 208 and 210. Mixers 208 and 210 each further receive a local oscillation (offset by 90 degrees) to generate I and Q signals for I and Q ingoing signal paths. Those of average skill in the art readily appreciate common PLL designs and the use of offset oscillations to generate the I and Q ingoing signal paths. Generally, the mixers 208 and 210 are operable to multiply the received local oscillation with the ingoing RF signals to down convert the ingoing RF signals from RF to one of an intermediate frequency (IF) or baseband frequency signal. In the described embodiment, the ingoing RF is down converted to IF.

The output of mixer 208 is produced to a variable gain amplifier (VGA) 212 for the in-phase (I) signal path while the output of mixer 210 is produced to VGA 214 for the quadrature phase (Q) signal path. The amplified IF produced by VGAs 212 and 214 are then produced to low pass filters (LPFs) 216 and 218 for low pass filtering to remove any LO feedthrough that is present as well as other DC and low frequency components. The low pass filtered outputs of LPFs 216 and 218 are then produced to two pairs of high pass VGAs (HP-VGAs) 220 and 222 that are operable to remove high frequency images and other signal components above an upper corner frequency of a specified frequency band or channel of interest. The outputs of HP-VGAs 222 are then produced to a baseband processor that includes analog-to-digital converters (ADCs) for each input path to convert ingoing signals to digital signals for processing by the processor. In an alternate implementation, the ADCs are external to the baseband processor and are part of the radio front end.

As may further be seen in FIG. 4, a pair of received signal strength indicators (RSSIs) 226 and 228 are coupled to receive a (wideband signal and a narrowband signal, respectively and to produce the wideband and narrowband signals to a baseband processor 224 by way of a multiplexer (mux) 230. The processor utilizes the RSSI measurements to determine appropriate gain level settings for at least one of the LNA 206, the VGAs 212 and 214, and the HP-VGAs 220 and 222. In one embodiment, the baseband processor 224 generates the mode signal that drives the coupling of Balun 202 within electrical connectivity of the radio front end of FIG. 4. In an alternate embodiment, hard logic makes mode determinations between single and double balanced modes of operation.

Figure 5:
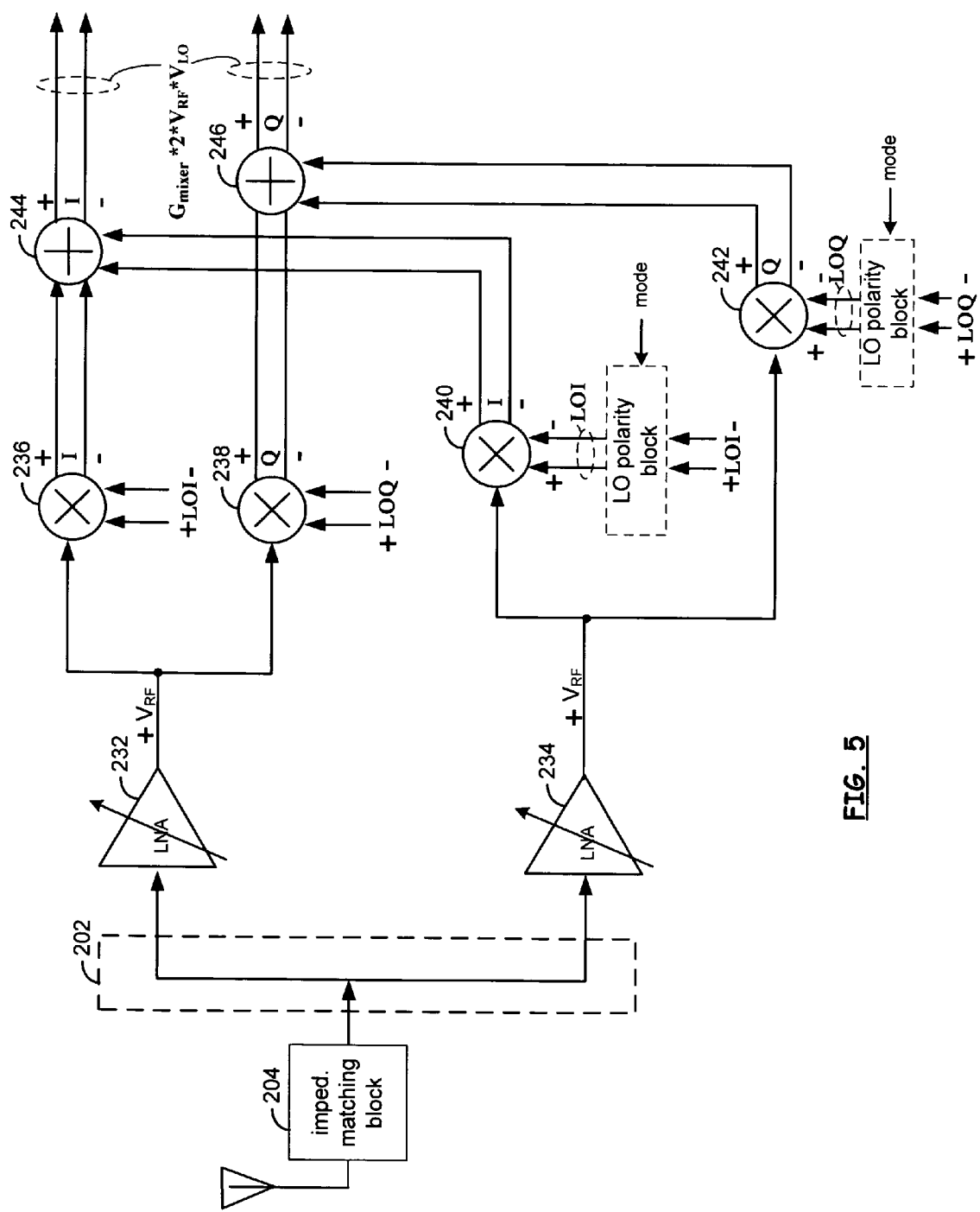
FIG. 5 is a functional block diagram of a radio receiver according to one embodiment of the invention configured to operate in a first mode of operation.

FIG. 5 is a functional block diagram of a radio receiver according to one embodiment of the invention configured to operate in a first mode of operation. Specifically, the Balun block 202 is configured to bypass Balun 202 of FIG. 4 to produce a single ended ingoing RF directly to each of LNAs 232 and 234. Each of the LNAs 232 and 234 produce a single ended output for a single balanced mode of operation.

The significant observation is that both of the LNAs 232 and 234 produce substantially similar signals (non-differential) relative to each other in this single balanced mode of operation. As may further be seen, each of mixers 236-242 receives a local oscillation (LO) signal of the same polarity. Mixers 236 and 240 produce a positive I component IF signal while mixers 238 and 242 each produce a positive Q component IF signal. Each of the mixers 236-242 are single balanced mixers and are operable to receive single-ended RF signals and differential LO to provide a differential mixed output which, in the described embodiment of the invention, is a differential intermediate frequency (IF) signal. The outputs of the mixers 236-242 are produced to a pair of summing elements 244 and 246. Specifically, summing element 244 receives the positive I component IF signals produced by mixers 236 and 240 while summing element 246 receives the positive Q component IF signals produced by mixers 238 and 242. Thus, summing element 244 produces an output signal equal to $G_{mixer}*2*V_{RF}*V_{LO}$ of the in-phase signal path. Summing element 246 produces an output signal equal to $G_{mixer}*2*V_{RF}*V_{LO}$ of the quadrature phase signal path. If the mixer provides non-unity gain, the output includes a gain component $G_{mixer}$ for the mixer(s) as well.

Figure 6:
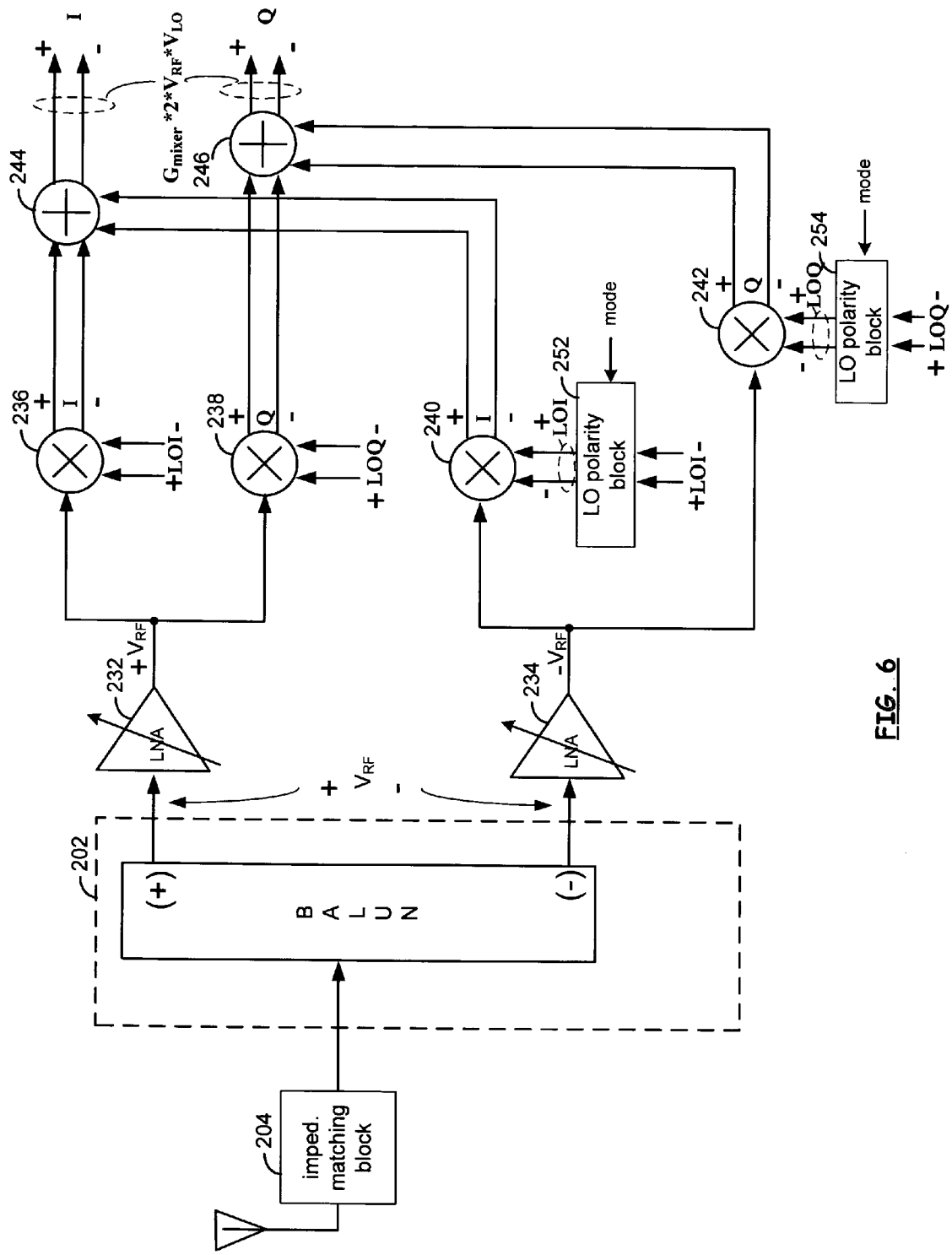
FIG. 6 is a functional block diagram of a radio receiver according to one embodiment of the invention configured to operate in a second mode of operation.

FIG. 6 is a functional block diagram of a radio receiver according to one embodiment of the invention configured to operate in a second mode of operation. More specifically, the radio receiver of FIG. 6 is configured to operate in a double balanced or differential mode of operation. The operation elements have similar reference numerals as discussed before and will not be repeated here. In a first mode of operation, for example, a single balanced mode of operation, Balun 202 is not electrically present. In one embodiment, Balun 202 is only included on circuit boards that are to operate in a double balanced mode. In an alternate embodiment, Balun 202 is included but is switched in and out of connectivity based upon a user selected mode of operation. In a second mode of operation, i.e., in the double balanced mode of operation, as illustrated here in FIG. 6, Balun 202 produces a differential (+/−) RF voltage to LNAs 232 and 234. LNA 232, based upon receiving the (+) RF voltage from Balun 202, produces an amplified (+) RF signal to mixers 236 and 238. Similarly, LNA 234, based upon receiving the (−) RF voltage from Balun 202, produces an amplified (−) RF signal to mixers 240 and 242. As the LNAs 232 and 234 have variable gain levels based upon gain level settings received from a baseband processor, in one embodiment, the circuit and corresponding methods include reducing amplification levels of the first and second amplifiers while operating in a single balanced mode of operation in relation to amplification levels of the first and second amplifiers while operating in a double balanced mode of operation. As with FIG. 5, mixers 236-242 are single balanced mixers. LNAs 232 and 234 and single-ended LNAs but the topology of FIG. 6 functions as a differential input LNA with double balanced mixing.

Under the described embodiment of the invention, if the polarity of the received local oscillation signal received by each of the mixers were to remain the same as illustrated in FIG. 5, summing elements 244 and 246 would each try to sum signals of substantially equal magnitude but of opposite polarity thereby producing an output substantially equal to zero. As such, one of two approaches may be implemented to allow the inputs to add to produce outputs equal to $G_{mixer}*2*V_{RF}*V_{LO}$ of the in-phase and quadrature phase signal paths similar to the single balanced operation described in relation to FIG. 5. In a first approach, summing elements 244 and 246 may be electrically removed from operation and may be replaced by subtracting elements to effectively negate (change polarity) of the incoming negative polarity mixer output of mixers 240 and 242. In the described embodiment of the invention, LO polarity blocks 252 and 254 are disposed to receive the positive polarity differential local oscillation and, based upon receiving the mode control signal indicating a double balanced mode of operation (e.g., the second state of the mode control signal in the described examples), and are operable to produce a differential LO with a reversed polarity to mixers 240 and 242, respectively. In a single balanced mode of operation, as based upon the first state of the mode control signal, LO polarity blocks 252 and 254 are operable to produce a positive polarity LO to mixers 240 and 242. Referring again to FIG. 5, it should be understood that the LO polarity blocks 252 and 254 are a part of the embodiment of FIG. 5 but were not discussed because the LO produced by the LO polarity blocks were the same polarity as received by the LO polarity block and did not change the polarity of the output of mixers 240 and 242.

Figure 7:
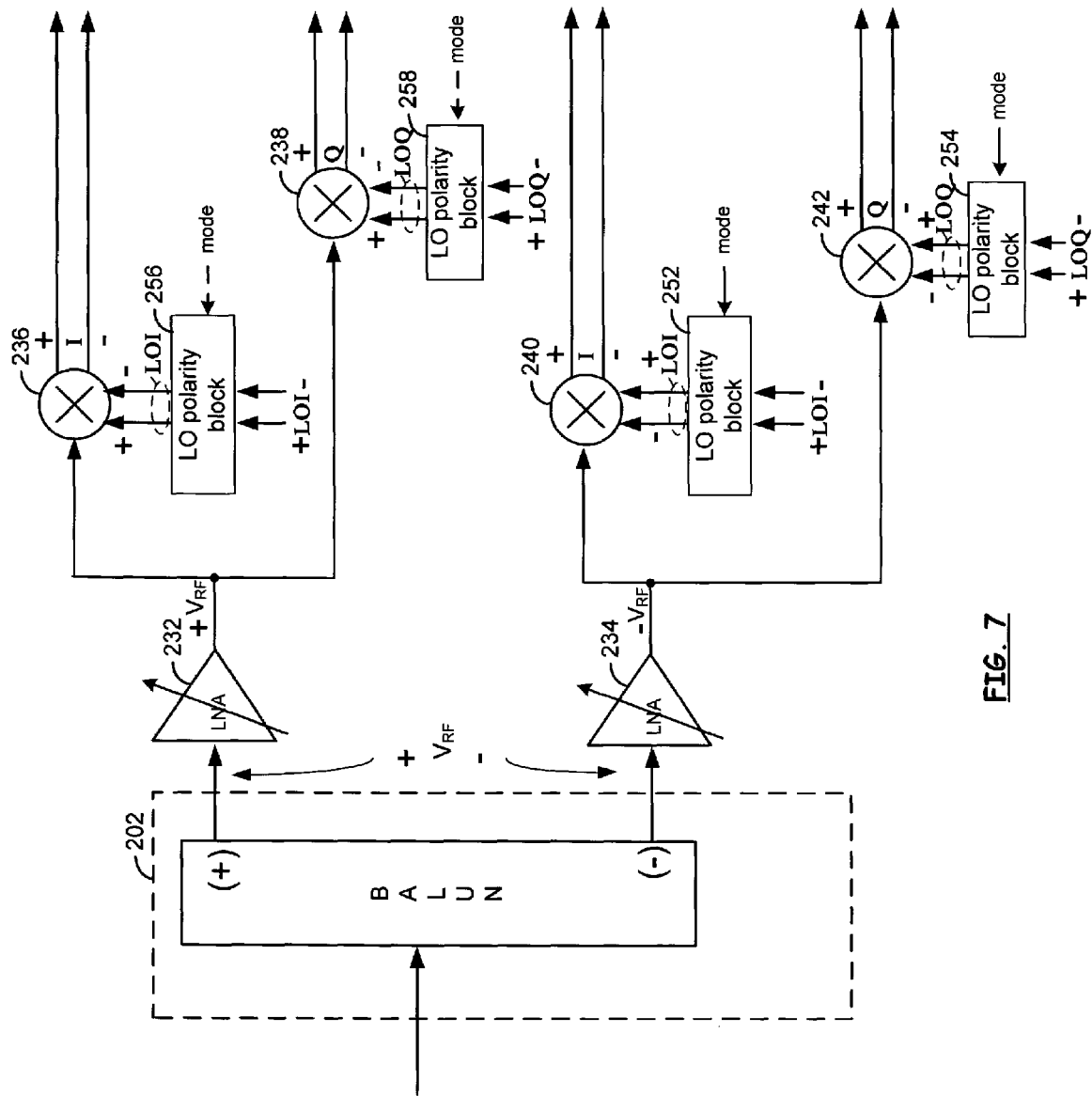
FIG. 7 is a functional block diagram of a radio receiver according to one embodiment of the invention configured to operate in a second mode of operation.

FIG. 7 is a functional block diagram of a radio receiver according to one embodiment of the invention configured to operate in a second mode of operation. One consideration in implementing a circuit that includes the LO polarity blocks is timing. In applications where timing of signal paths should be kept equal, using LO polarity blocks such as blocks 252 and 254 to reverse the polarity of the LO for some but not all of the mixers (e.g., mixers 236-242) results in the down converted signal paths coupled to the LO polarity blocks lagging behind the signal paths that do not have mixers coupled to the LO polarity blocks.

For example, the output of mixers 236 and 238 will precede the outputs of mixers 240 and 242. It is therefore advantageous to introduce an equal amount of delay for each signal path. As such, the embodiment of FIG. 7 illustrates an LO polarity block that is operatively coupled to produce an LO to an associated mixer. Thus, in addition to the LO polarity blocks 252 and 254 of FIG. 6 that are operable to reverse the LO for double balanced modes of operation, LO polarity blocks 256 and 258 are added to the circuit to produce LO to mixers 236 and 238, respectively, merely to introduce an amount of delay that is equal to the delay introduced by LO polarity blocks 252 and 254. Thus, even if LO polarity blocks 256 and 258 are not used to reverse the polarity of the LO, they are helpful for matching the timing of the associated circuit paths. For such operation, the mode inputs shown are not necessary and are thus shown as dashed line inputs (to indicate they are optional).

One more point is illustrated by the embodiment of FIG. 7. Namely, LO polarity blocks may be coupled to mixers 236 and 238 instead of 240 and 242. Further, even if each mixer in the radio front end has an associated LO polarity block for timing purposes, the LO inputs of mixers 236 and 238 could be inverted instead of the LO inputs of mixers 240 and 242. Finally, it should be understood that the outputs of the mixers are not shown to be coupled downstream circuitry for simplicity, but it should be understood that the outputs are produced to downstream elements such as summing elements 244 and 246 of FIGS. 5 and 6.

Figure 8:
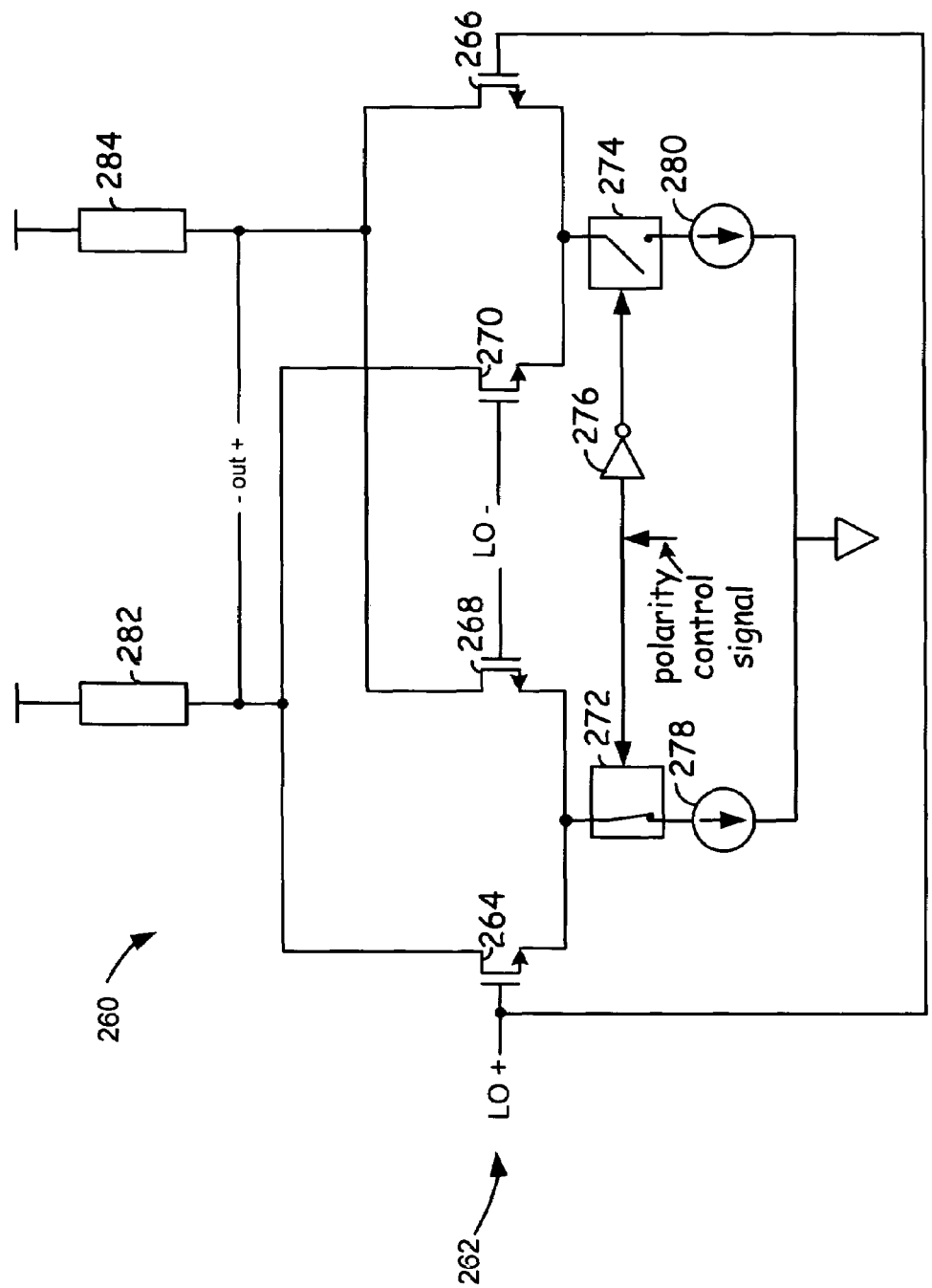
FIG. 8 is an embodiment of a LO polarity block formed according to one embodiment of the invention.

FIG. 8 is an embodiment of a LO polarity block formed according to one embodiment of the invention. As may be seen, the LO polarity block shown generally at 260 includes four MOSFET devices shown generally at 262 that are operably disposed to receive a differential LO. Specifically, MOSFETs 264 and 266 are operably disposed to receive LO+ while MOSFETs 268 and 270 are operably disposed to receive LO−. As may further be seen, source terminals of MOSFETs 264 and 268 are coupled to each other and the source terminals of MOSFETs 266 and 270 are coupled to each other. Further, the source terminals of MOSFETs 264 and 268 are coupled to a switch 272 while the source terminals of MOSFETs 266 and 270 are coupled a switch 274. Only one of switch 272 and 274 is closed at a time as each switch receives an opposite state of a polarity control signal (the mode control signal of FIGS. 5 and 6). As may be seen, an inverter 276 is used to invert the state of the polarity control signal to result in one of the switches 272 and 274 being open while the other is closed. Finally, current source 278 is utilized to provide bias for MOSFETs 264 and 268 while current source 280 is utilized to provide bias for MOSFETs 266 and 270. These current sources, in an alternate embodiment, are replaced by a single current source coupled to the outputs of switches 272 and 274. Finally, the LO polarity block shown at 260 includes a pair of load devices comprising load devices 282 and 284 operably disposed between MOSFETs 262 and a supply as shown in FIG. 7.

In operation, the polarity of the output of block 260 is a function of which of the switches 272 and 274 is closed and, therefore, which of the MOSFETs 264 and 268 or MOSFETs 266 and 270 are conducting current. Stated simply, the polarity of the output signal reverses from what is shown in FIG. 7 when switch 272 opens and switch 274 closes based upon a change in state of the polarity control signal (the mode control signal). Thus, for the example shown, if the configuration as shown produces a positive polarity LO for a single balanced mode of operation, then a change in the polarity control signal results in a reversed or negative polarity differential LO signal for the double balanced mode of operation.

Figure 9:
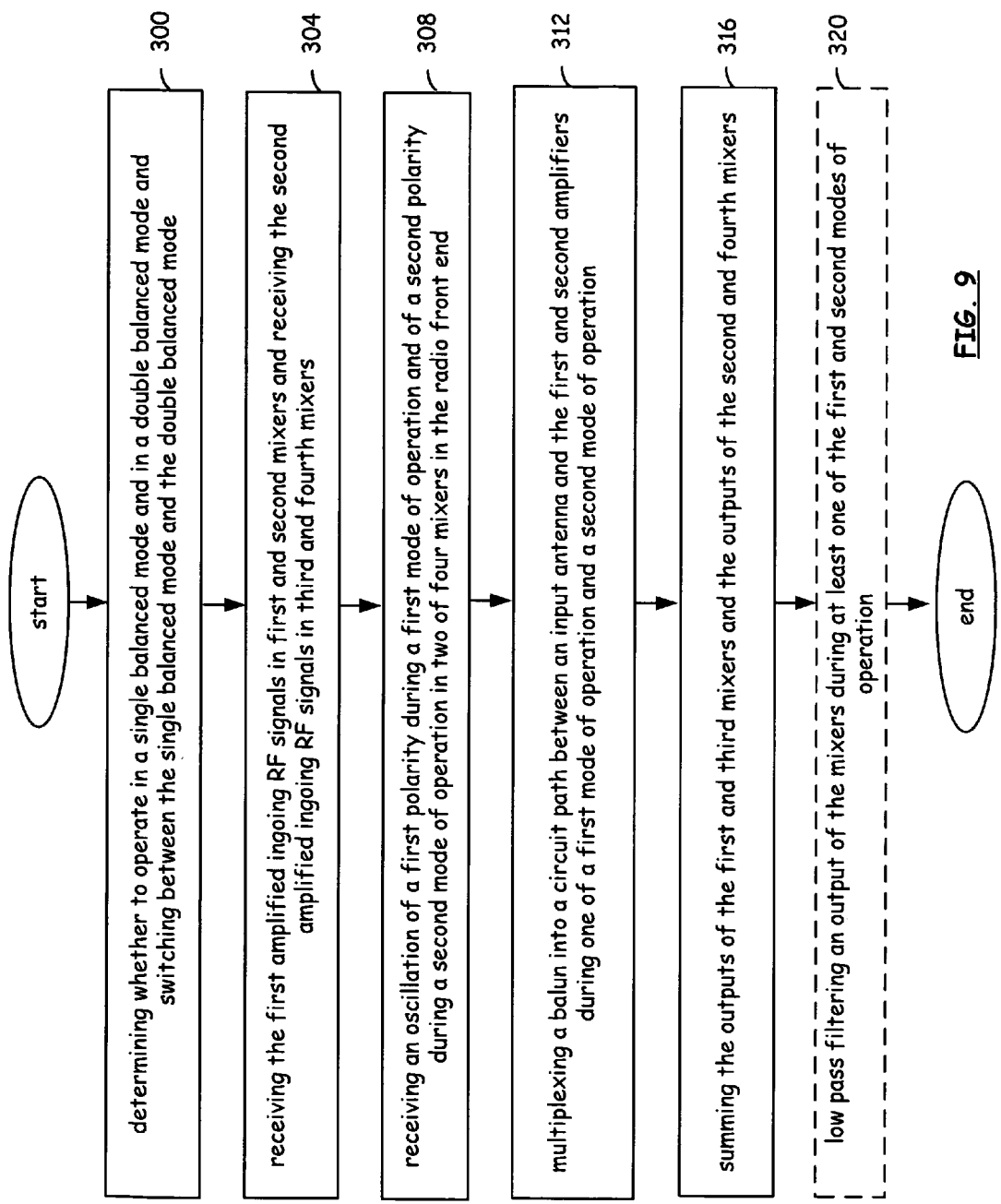
FIG. 9 is a flow chart illustrating a method according to one embodiment of the invention.

FIG. 9 is a flow chart illustrating a method according to one embodiment of the invention. Initially the method includes determining whether to operate in a single balanced mode and in a double balanced mode of operation, and, based upon the mode of operation, the method includes switching between the single balanced mode and the double balanced mode (step 300). In one described embodiment, for example, logic associated with a baseband processor determines whether to operate in a single or double balanced mode of operation and produces the mode control signal to a switch or switching network that is operable to switch a Balun in or out of connectivity and to LO polarity blocks 252 and 254 of FIG. 6. In one particular embodiment, such a determination is made by comparing wideband signal strength measurements to narrow band signal strength measurements and determined relative value of signal and noise/interference. Such logic may readily be formed in discrete hardware.

Thereafter, the method includes receiving the first amplified ingoing RF signals in first and second mixers and receiving the second amplified ingoing RF signals in third and fourth mixers (step 304). Further, the method includes receiving an oscillation (LO signal) of a first polarity during a first mode of operation and of a second polarity during a second mode of operation in two of the four mixers in the radio front end (step 308). Referring back to FIG. 6, mixers 240 and 242 are shown to be operably coupled to LO polarity blocks 252 and 254, respectively. It is understood, as this method step suggests, that the LO polarity blocks 252 and 254 may be operably disposed to provide the LO signal with a positive or negative polarity to mixers 236 and 238 alternatively. In yet another embodiment, each of the four mixers is operably disposed to receive an LO signal from an associated LO polarity block.

Thereafter, when transitioning from a single balanced to a double balanced mode of operation, the method includes multiplexing a Balun into a circuit path between an input antenna and the first and second amplifiers during one of a first mode of operation and a second mode of operation (step 312). The method further includes summing the outputs of the first and third mixers and the outputs of the second and fourth mixers (step 316). In an alternate embodiment that does not include LO polarity blocks, a configurable summing element block may be utilized wherein, in a double balanced mode of operation, the outputs of the third and fourth mixers are subtracted from the outputs of the first and second mixers, respectively, since the outputs of the third and fourth mixers will have a negative polarity (to effective add the outputs by subtracting a negative output). Finally, an optional step includes high pass filtering an output of the mixers during at least one of the first and second modes of operation (step 320).

Generally, the circuit and method of the present invention allow a user to select between single balanced and double balanced operation according to specific application requirements. Thus, according to the application requirements and whether a single balanced (with worse noise performance) or double balanced (with better noise performance) mode of operation is selected, downstream high pass filtering as provided in step 320 may be desirable. In the described embodiments, an integrated circuit radio front end is installed in a circuit board that includes a Balun for applications in which a double balanced mode is preferred. In applications in which a single balanced mode is preferred, the integrated circuit radio front end is installed in a circuit board that does not include a Balun. In those situations in which a Balun is included on the circuit board, the above steps may be utilized to selectively switch a Balun in and out of connectivity to switch between modes of operation. Thus, in one embodiment, a user selects one of the first and second modes of operation with a pin setting or selection. Thus, logic and the method for determining whether to operate in one of the first and second modes of operation is based upon the pin selection or configuration. In an alternate embodiment, as suggested before by examining received signal strength indications, the method of determining whether to operate in a single or double balanced mode examining a signal-to-noise ratio of a received radio frequency signal. In yet another embodiment, wherein power savings are important and perhaps a dominant consideration, the method includes determining to operate in one of the first and second modes of operation based upon a power mode of operation (e.g., is the receiver operating under battery power or in a reduced power mode) or, alternatively, by a battery strength indication provided to the logic for making mode of operation determinations.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified without departing from the scope or teachings of the invention.

The invention claimed is:

1. An integrated circuit radio transceiver, comprising:
   a configurable radio front end operable to receive ingoing radio frequency (RF) signals and to produce ingoing digital signals based upon the ingoing RF signals and further operable to receive outgoing digital signals and to produce outgoing RF signals;
   a baseband processor operably coupled to the radio front end to receive the ingoing digital signals and to produce the outgoing digital signals; and
   wherein the configurable radio front end further includes:
      a configurable balun block that receives the ingoing RF signals and bypasses balun circuitry to produce two single ended ingoing RF signals when operating in a single balanced mode and that produces a differential ingoing RF signal when operating in a double balanced mode;
      mixing circuitry for down-converting single ended ingoing RF signals and the differential ingoing RF signals based on a current mode of operation; and
      polarity control circuitry for controlling mixer output polarity of at least one mixer of the mixing circuitry; and
   wherein the integrated circuit radio transceiver bypasses the balun circuitry when operating in the single balanced mode and modifies a polarity of at least one mixer output when operating in a double balanced mode.

2. The integrated circuit radio transceiver of claim 1 wherein the configurable balun block further includes:
   first and second low noise amplifiers operable to produce first and second amplified ingoing RF signals;
   first and second mixers operably disposed to receive the first amplified ingoing RF signals; and
   third and fourth mixers operably disposed to receive the second amplified ingoing RF signals.

3. The integrated circuit radio transceiver of claim 2 wherein the first and second mixers are operably disposed to receive an oscillation of a first polarity during a first mode of operation.

4. The integrated circuit radio transceiver of claim 2 wherein the first and second mixers are operably disposed to receive an oscillation of a second polarity during a second mode of operation.

5. The integrated circuit radio transceiver of claim 2 wherein the third and fourth mixers are operably disposed to receive an oscillation of a first polarity during a first mode of operation.

6. The integrated circuit radio transceiver of claim 2 wherein the third and fourth mixers are operably disposed to receive an oscillation of a second polarity during a second mode of operation.

7. The integrated circuit radio transceiver of claim 2 wherein either the first and second mixers or the third and fourth mixers receive a local oscillation with a first polarity in a first mode of operation and a second polarity in a second mode of operation, respectively.

8. The integrated circuit radio transceiver of claim 2 wherein the balun circuitry is multiplexed into a circuit path between an input antenna and the first and second low noise amplifiers during one of a first mode of operation and a second mode of operation.

9. The integrated circuit radio transceiver of claim 8 wherein, while the balun circuitry is multiplexed into the circuit path, either the first and second mixers or the third and fourth mixers receive a local oscillation with polarity that is switched.

10. The integrated circuit radio transceiver of claim 8 wherein, while the balun is multiplexed into the circuit path, the output of one of the first mixer and the third mixer is subtracted from the other.

11. The integrated circuit radio transceiver of claim 8 wherein, while the balun is multiplexed into the circuit path, the output of one of the second mixer and the fourth mixer is subtracted from the other.

12. The integrated circuit radio transceiver of claim 8 wherein the outputs of the first mixer and the third mixer are summed and the outputs of the second mixer and the fourth mixer are summed.

13. A radio front end, comprising:
   a configurable input stage that is operable in a single balanced mode and in a double balanced mode;
   wherein the radio front end, in a first mode of operation:
      bypasses balun circuitry;
      produces a single ended radio frequency signal to two sets of in-phase and quadrature phase signal processing paths; and
      mixes the single ended radio frequency signal in each of the two sets of in-phase and quadrature phase signal processing paths with LO signals having the same polarity; and
   wherein the radio front end, in a second mode of operation:
      operably couples the balun circuitry to produce, to the two sets of in-phase and quadrature phase signal processing paths, an ingoing differential RF signal;
      processes the ingoing differential RF signal in two sets of in-phase and quadrature phase signal processing paths; and
      mixes the ingoing differential RF signal in a first set of in-phase and quadrature phase signal processing paths with LO signals having a first polarity and in a second set of in-phase and quadrature phase signal processing paths with LO signals having a second polarity.

14. The radio front end of claim 13 wherein the configurable input stage further includes:

first and second low noise amplifiers operable to produce first and second amplified ingoing RF signals based upon ingoing RF signals;

first and second mixers operably disposed to receive the first amplified ingoing RF signals; and third and fourth mixers operably disposed to receive the second amplified ingoing RF signals.

15. The radio front end of claim 14 wherein the first and second mixers are operably disposed to receive an oscillation of a first polarity during a first mode of operation.

16. The radio front end of claim 14 wherein the first and second mixers are operably disposed to receive an oscillation of a second polarity during a second mode of operation.

17. The radio front end of claim 14 wherein the third and fourth mixers are operably disposed to receive an oscillation of a first polarity during a first mode of operation.

18. The radio front end of claim 14 wherein the third and fourth mixers are operably disposed to receive an oscillation of a second polarity during a second mode of operation.

19. The radio front end of claim 14 wherein either the first and second mixers or the third and fourth mixers receive a local oscillation with a first polarity in a first mode of operation and a second polarity in a second mode of operation.

20. The radio front end of claim 13 wherein a balun circuitry is multiplexed into a circuit path between an input antenna and the first and second low noise amplifiers during one of a first mode of operation and a second mode of operation.

21. The radio front end of claim 20 wherein, while the balun is multiplexed into the circuit path, either the first and second mixers or the third and fourth mixers receive a local oscillation with polarity that is switched.

22. The radio front end of claim 20 wherein, while the balun is multiplexed into the circuit path, the output of one of the first and third mixers is subtracted from the other.

23. The radio front end of claim 20 wherein, while the balun is multiplexed into the circuit path, the output of one of the second and fourth mixers is subtracted from the other.

24. The radio front end of claim 20 wherein the outputs of the first and third mixers are summed and the outputs of the second and fourth mixers are summed.

25. A method in a radio front end, comprising:
determining whether to operate in a single balanced mode and in a double balanced mode based upon whether the receiver is operating with battery power;
when operating in a single balanced mode;
summing a plurality of mixer outputs; and
reducing amplification levels of the first and second low noise amplifiers in relation to amplification levels of the first and second amplifiers while operating in a double balanced mode of operation; and
when operating in a double balanced mode, coupling a balun to produce a differential RF signal based on a single ended input RF signal and subtracting at least one mixer output from another mixer output.

26. The method of claim 25 further including producing first and second amplified ingoing RF signals based upon ingoing RF signals.

27. The method of claim 26 further including receiving the first amplified ingoing RF signals in first and second mixers and receiving the second amplified ingoing RF signals in third and fourth mixers.

28. The method of claim 27 further including receiving an oscillation of a first polarity during a first mode of operation and of a second polarity during a second mode of operation in at least two of the mixers in the radio front end.

29. The method of claim 28 wherein a balun is multiplexed into a circuit path between an input antenna and first and second low noise amplifiers during one of a first mode of operation and a second mode of operation.

30. The method of claim 27 wherein the outputs of the first and third mixers are summed and the outputs of the second and fourth mixers are summed with the first and third mixers, respectively, during a first mode of operation and are subtracted from the first and third mixers, respectively, during a second mode of operation.

31. The method of claim 30 further including high pass filtering an output of the mixers during at least one of the first and second modes of operation.

32. The method of claim 25 wherein the determining step includes selecting one of a first and second mode of operation based upon a pin selection.

33. The method of claim 25 wherein the determining step includes selecting one of a first and second mode of operation based upon a signal-to-noise ratio of a received radio frequency signal.

34. A radio front end, comprising:
low noise amplification circuitry operable to produce amplified RF signals;
configurable balun block coupled to receive the amplified RF signals, wherein the configurable balun block bypasses balun circuitry and produces two single ended ingoing RF signals when operating in a single balanced mode and that produces a differential ingoing RF signals when operating in a double balanced mode;
a plurality of mixers operably disposed to receive the two single ended ingoing RF signals when operating in a single balanced mode or the differential ingoing RF signals when operating in a double balanced mode;
one LO polarity block for each mixer and coupled to each mixer, each LO polarity block operably disposed to receive an LO and operable to produce one of a positive or a negative polarity LO to the associated mixer wherein each LO polarity block produces a substantially equal delay to each of the other LO polarity blocks wherein at least one LO polarity block is introduces processing delay and does not reverse a polarity of a received LO to produce a negative LO to the associated mixer.

* * * * *